Oct. 25, 1955   J. SCHUMACHER   2,721,490
TIRE CHAIN ATTACHING CLIP
Filed May 29, 1953

Jack Schumacher
INVENTOR.

BY

2,721,490

TIRE CHAIN ATTACHING CLIP

Jack Schumacher, University City, Mo.

Application May 29, 1953, Serial No. 358,404

1 Claim. (Cl. 81—15.8)

My invention relates to improvements in clips for attaching non-skid tire chains to automobile tires.

The primary object of my invention is to provide a clip for straddling automobile tires of different sizes in tight friction gripping engagement with the side walls thereof and embodying terminal lugs for attachment of the end links of a tire chain to the clip so that the chain may be pulled around the tire by rolling the tire forwardly a complete revolution without danger of the links slipping off the lugs.

Another object is to provide a clip for the above purpose which is easy to attach and detach and adapted for inexpensive manufacture.

Other and subordinate objects, within the purview of my invention, together with the precise nature of my improvements will become readily apparent when the succeeding description and claim are read with reference to the drawing accompanying and forming part of this specification.

Figure 1:
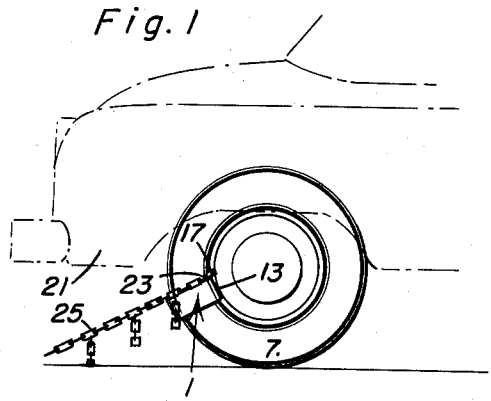
Figure 1 is a fragmentary view in side elevation of my improved clip attached to an automobile wheel tire with the clip positioned on the tire for attachment of a tire chain to the clip.

Referring to the drawing by numerals, according to my invention, in the illustrated embodiment thereof, a clip 1 of flat, highly resilient metal is provided and which is of stirrup shape to provide a tire tread spanning, bight portion 3 curved in a long arc to fit across the tread 5 of the tire 7, and outwardly bowed, normally convergent side legs 9 fitting flat and tightly gripping the side walls 11 of the tire 7.

The side legs 9 terminate in a pair of outwardly bent lateral ledges 13 of flat form and which, at what constitutes the front or leading edge 15 of the clip 1 are formed with a pair of right angled edge, chain attaching lugs 17 of flat square form. The chain attaching lugs 17 extend oppositely from the ledges 13 relative to the legs 9 and are spaced outwardly from said legs 9 by the ledges 13 for a purpose presently seen.

Figure 2:
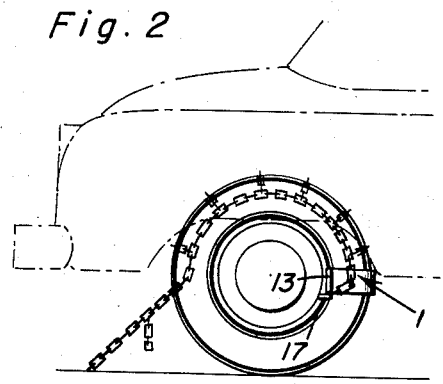
Figures 2, 3 and 4 are fragmentary views in side elevation illustrating the manner in which the clip is revolved to pull the tire chain around a tire.
Figure 3:
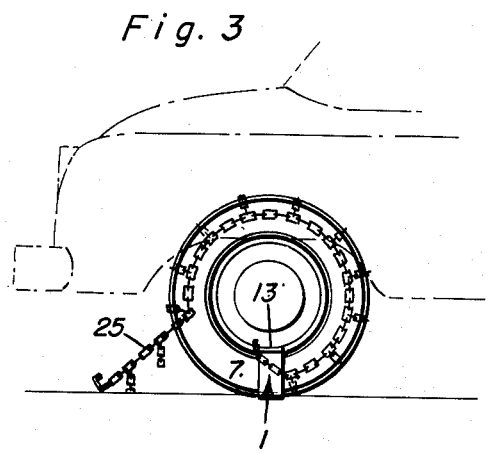
Figure 4:
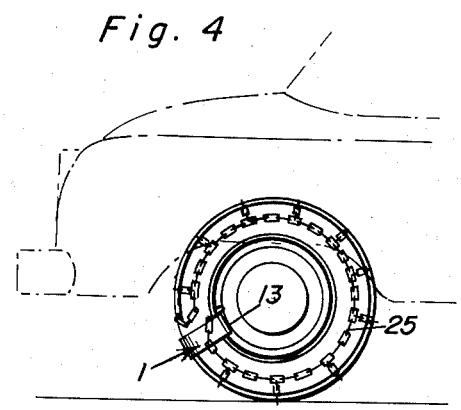
Figure 5:
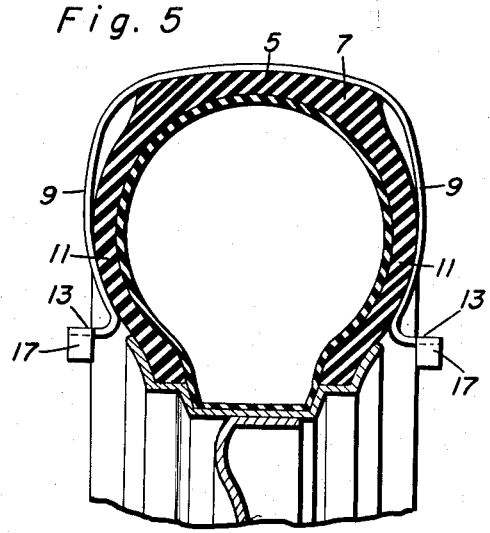
Figure 5 is an enlarged view in transverse section illustrating the clip in front elevation attached to the automobile wheel tire.
Figure 6:
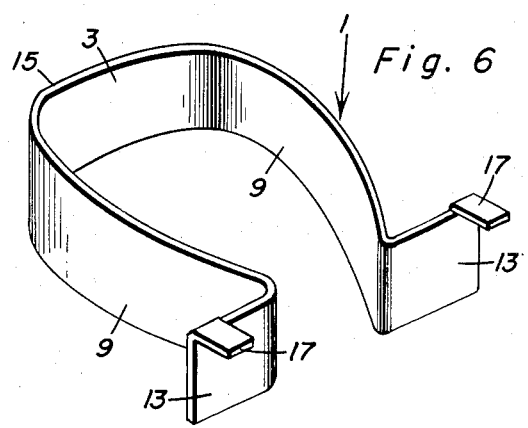
Figure 6 is a further enlarged view in perspective of the clip detached.

In using the described clip, it is positioned over a tire 7 rearwardly of the ground engaging portion of the tire between said portion and the wheel fender 21 with its front or leading edge 15 uppermost to position the lugs 17 uppermost and in forwardly extending position, as shown in Figure 1. The end links, as at 23, of the tire chain 25 are then hooked over and under the lugs 17 with the chain 25 spread out on the ground in rearwardly extending position and the end links 23 overlying and being supported by the forward edges of the ledges 13. With the tire chain 25 thus attached, the automobile is driven forwardly sufficiently to revolve the tire 7 a complete revolution and revolve the clip therewith. During substantially two-thirds of the revolution, the clip 1 will be revolved upwardly and forwardly and then downwardly and the chain 25 will be pulled by the lugs 17 up over the top half of the tire 7, as shown in Figure 2 with the ledges 13 underlying the chain 25 and the lugs 17 spacing the links 23 outwardly of the side walls of the tire 7. During the final third of the revolution, the clip 1 will be revolved forwardly and downwardly and then rearwardly past the vertical center of the tire 7, as shown in Figure 3 and then upwardly and rearwardly into chain attaching position as shown in Figure 4 to pull the chain under the tire 7 so that the ends of the chain 25 may be attached together above the ground, after which the clip 1 may be detached from the links 23 and tire 7 in a manner which will be manifest.

The foregoing will, it is believed suffice to impart a clear understanding of my invention, without further explanation.

Manifestly, the invention, as described, is susceptible of modification without departing from the inventive concept, and right is herein reserved to such modifications as fall within the scope of the appended claim.

What is claimed as new is as follows:

A tire chain attaching clip of stirrup form and of relatively wide resilient flat metal for straddling a tire and including a pair of outwardly bowed side legs for fitting and tightly gripping the side walls of the tire so that the clip will be revolved by rolling of the tire forwardly on the ground, said legs terminating in a pair of lateral outturned rigid ledges each having a right angled flat rigid corner lug thereon at one edge of the clip, said lug being spaced from the side leg and extending from the ledge oppositely relative to the leg and fitting in an end link of the chain so that, when the clip is placed on a tire with the lugs in leading position for rotation, end links of the chain may be positioned over said lugs with the chain extending rearwardly of the clip across the ledges and the end links retained on the lugs by the ledges during revolving of the clip and remain spaced from the side walls of the tire.

References Cited in the file of this patent

UNITED STATES PATENTS

| 1,065,758 | Woodwell | June 24, 1913 |
| 1,266,507 | Ludwig | May 14, 1918 |
| 2,076,894 | Johnson | Apr. 13, 1937 |

FOREIGN PATENTS

| 80,657 | Norway | Aug. 25, 1952 |